United States Patent
Ward

(10) Patent No.: US 10,430,705 B2
(45) Date of Patent: Oct. 1, 2019

(54) SECURE TRAILER CONNECTION SYSTEM

(71) Applicant: Robert Bosch GmbH, Stuttgart (DE)

(72) Inventor: Gary B. Ward, Brighton, MI (US)

(73) Assignee: ROBERT BOSCH GMBH, Stuttgart (DE)

( * ) Notice: Subject to any disclaimer, the term of this patent is extended or adjusted under 35 U.S.C. 154(b) by 16 days.

(21) Appl. No.: 15/683,922

(22) Filed: Aug. 23, 2017

(65) Prior Publication Data

US 2019/0065931 A1 Feb. 28, 2019

(51) Int. Cl.
| | | |
|---|---|---|
| *G06N 3/04* | (2006.01) | |
| *B60D 1/62* | (2006.01) | |
| *B60R 1/00* | (2006.01) | |
| *B60K 35/00* | (2006.01) | |
| *G06N 3/08* | (2006.01) | |
| *B60T 7/20* | (2006.01) | |
| *B60T 17/18* | (2006.01) | |
| *B60D 1/18* | (2006.01) | |
| *B60D 1/06* | (2006.01) | |

(52) U.S. Cl.
CPC ............... *G06N 3/04* (2013.01); *B60D 1/06* (2013.01); *B60D 1/18* (2013.01); *B60D 1/62* (2013.01); *B60K 35/00* (2013.01); *B60R 1/00* (2013.01); *B60T 7/20* (2013.01); *B60T 17/18* (2013.01); *G06N 3/08* (2013.01); *B60K 2370/11* (2019.05); *B60K 2370/1442* (2019.05); *B60K 2370/152* (2019.05); *B60K 2370/21* (2019.05); *B60R 2300/205* (2013.01); *B60R 2300/80* (2013.01)

(58) Field of Classification Search
CPC . G06N 3/04; G06N 3/08; B60K 35/00; B60K 2350/2013; B60K 2350/1032; B60K 2350/106; B60K 2350/1004; B60R 1/00; B60R 2300/80; B60R 2300/205; B60D 1/62; B60D 1/06; B60T 7/20
See application file for complete search history.

(56) References Cited

U.S. PATENT DOCUMENTS

| | | | |
|---|---|---|---|
| 5,159,312 A | 10/1992 | Engle | |
| 5,421,600 A | 6/1995 | Jones et al. | |
| 8,855,854 B2 | 10/2014 | Schmidt et al. | |
| 9,555,832 B2 | 1/2017 | Smit et al. | |
| 9,840,119 B1 * | 12/2017 | Melaragni | B60D 1/36 |
| 2002/0149673 A1 | 10/2002 | Hirama et al. | |
| 2006/0038381 A1 * | 2/2006 | Gehring | B60D 1/36 |
| | | | 280/477 |
| 2014/0267688 A1 * | 9/2014 | Aich | H04N 7/181 |
| | | | 348/113 |
| 2015/0108736 A1 | 4/2015 | Jamieson | |
| 2017/0151846 A1 * | 6/2017 | Wuergler | B60D 1/36 |
| 2017/0174275 A1 * | 6/2017 | Mohamad Jembari | |
| | | | B62D 53/12 |

(Continued)

*Primary Examiner* — Rodney A Butler
(74) *Attorney, Agent, or Firm* — Michael Best & Friedrich LLP

(57) ABSTRACT

A system for detecting if a hitch connecting a trailer and a vehicle is not secure. The system comprises a sensor, an output device, and electronic control unit. The electronic control unit receives information about the hitch connecting the trailer and the vehicle from the sensor. The electronic control unit detects if the hitch connecting the trailer and the vehicle is not secure. If the hitch connecting the trailer and the vehicle is not secure the electronic control unit generates a driver notification and controls the vehicle's motion.

10 Claims, 6 Drawing Sheets

(56) References Cited

U.S. PATENT DOCUMENTS

2017/0368897 A1* 12/2017 Brickley .................. H04W 4/70
2018/0039283 A1* 2/2018 Srivastava ............ B60W 40/13

* cited by examiner

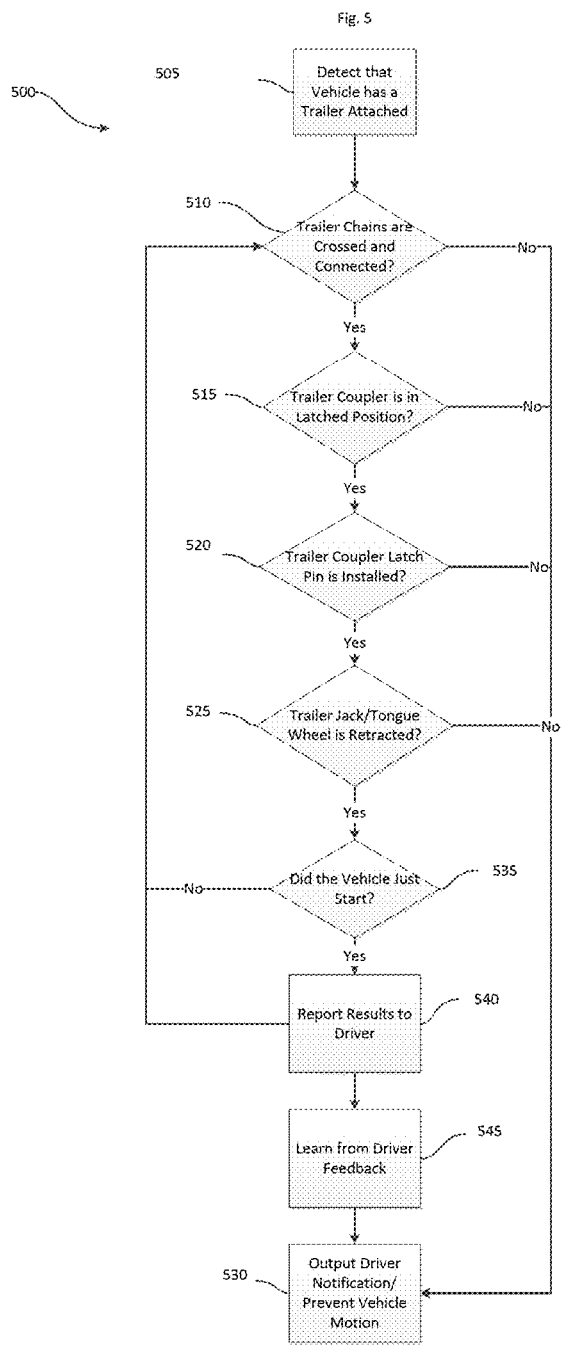

SECURE TRAILER CONNECTION SYSTEM

FIELD

Embodiments relate to trailer attachments for vehicles.

BACKGROUND

Trailers are often attached to vehicles to help transport bulky cargo. Trailers are attached to and unattached from a vehicle by a driver via a trailer hitch. A trailer is usually attached to a vehicle with chains as a precautionary measure to provide a secondary attachment in case the connection provided by the hitch becomes undone or fails.

SUMMARY

Sometimes a trailer is incorrectly attached to a vehicle and detaches from the vehicle while the vehicle is in motion. This can be harmful to nearby vehicles. The primary cause of the trailer detaching from the vehicle is the trailer not being properly connected to the vehicle via crossed chains. The chains provide a failsafe mechanism that will connect the trailer to the vehicle if all other connecting mechanisms fail. Other mechanisms for attaching a trailer include a latch and a pin. Embodiments described herein provide, among other things, a system for checking that the trailer has been properly attached to the vehicle and that none of the mechanisms that connect the trailer and the vehicle have failed.

Embodiments provide, among other things, a system and a method for detecting if a hitch connecting a trailer and a vehicle is not secure. One embodiment provides a system for detecting if a hitch connecting a trailer and a vehicle is not secure. The system comprises a sensor, an output device, and an electronic control unit. The electronic control unit is configured to receive information from the sensor about the hitch connecting the trailer and the vehicle. The electronic control unit is also configured to detect if the hitch connecting the trailer and the vehicle is not secure. If the hitch connecting the trailer and the vehicle is not secure the electronic control unit generates a driver notification and controls the motion of the vehicle.

Another embodiment provides a method for detecting if a hitch connecting a trailer and a vehicle is not secure. The method comprises receiving information about the hitch connecting the trailer and the vehicle from a sensor. The method also comprises detecting, with the electronic control unit, if the hitch connecting the trailer and the vehicle is not secure. If the electronic control unit detects that the hitch connecting the trailer and the vehicle is not secure the electronic control unit generates a driver notification and controls the motion of the vehicle.

Other aspects, features, and embodiments will become apparent by consideration of the detailed description and accompanying drawings.

BRIEF DESCRIPTION OF THE DRAWINGS

FIG. 5 is a flowchart of a method for detecting, with the system of FIG. 1, if a hitch connecting a trailer and a vehicle is not secure.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. For example, "control units" and "controllers" described in the specification can include one or more electronic processors, one or more memory modules including non-transitory computer-readable medium, one or more input/output interfaces, one or more application specific integrated circuits (ASICs), and various connections (for example, a system bus) connecting the various components.

Figure 1:
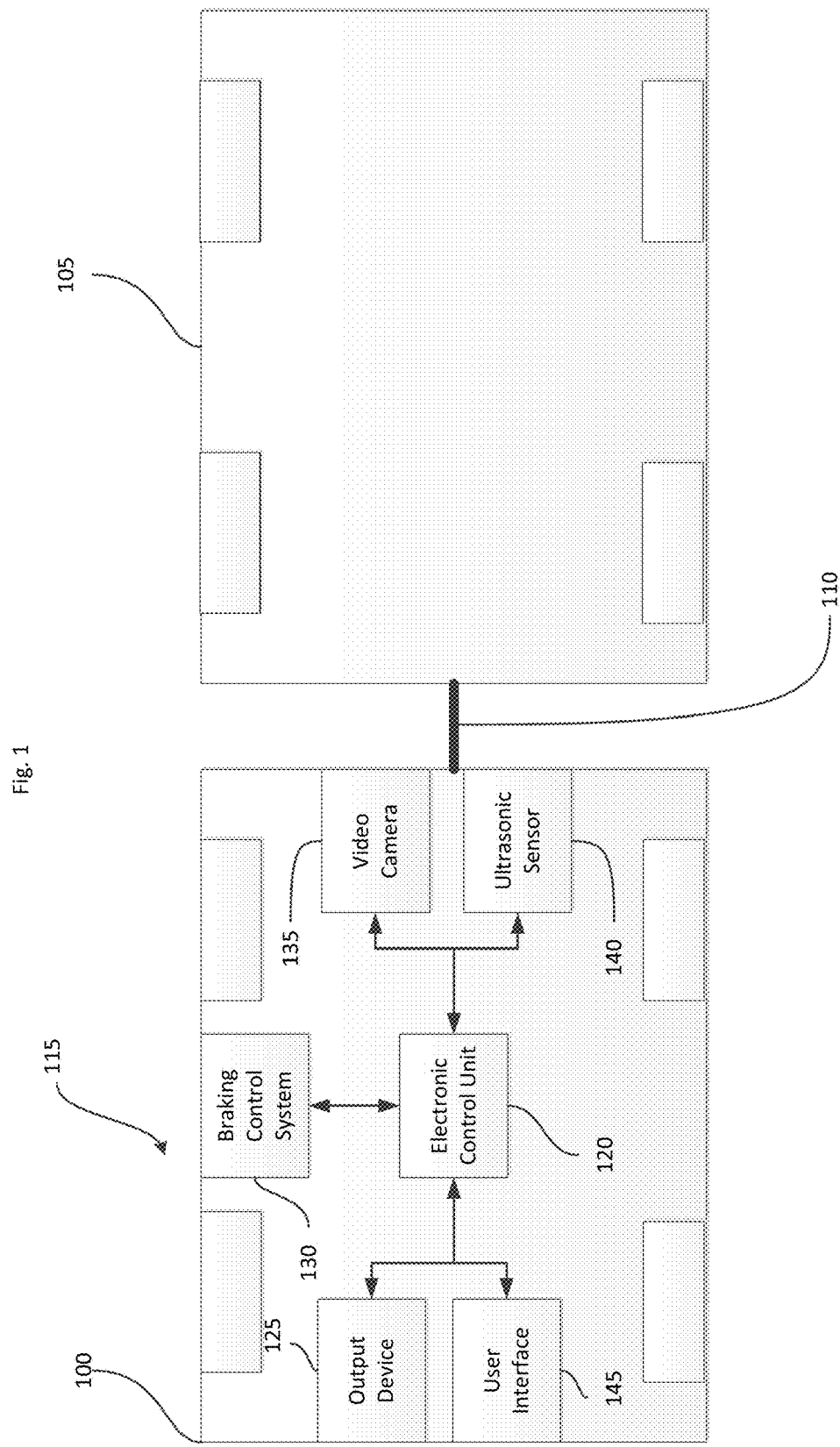
FIG. 1 is a block diagram of a vehicle attached to a trailer and equipped with a system for detecting if the hitch connecting the trailer and the vehicle is not secure.

FIG. 1 illustrates a vehicle 100 connected to a trailer 105 via a hitch 110. The vehicle is equipped with a system 115 used to detect if a hitch connecting a trailer and a vehicle is not secure. The vehicle 100, although illustrated as a four-wheeled vehicle, may encompass various types and designs of vehicles. For example, the vehicle 100 may be an automobile, a motorcycle, a truck, a bus, a semi-tractor, and others. The vehicle 100 includes at least some autonomous functionality, but may also require a driver or operator to perform driving functions. In the example illustrated, the system 115 includes several hardware components including an electronic control unit (ECU) 120, an output device 125, a braking control system 130, a video camera (a sensor) 135, an ultrasonic sensor 140, and a user interface 145. The components of the system 115 may be of various constructions and may use various communication types and protocols.

The electronic control unit 120 may be communicatively connected to the output device 125, braking control system 130, video camera 135, ultrasonic sensor 140, and user interface 145 via various wired or wireless connections. For example, in some embodiments, the electronic control unit 120 is directly coupled via a dedicated wire to each of the above-listed components of the system 115 used to detect if a hitch connecting a trailer and a vehicle is not secure. In other embodiments, the electronic control unit 120 is communicatively coupled to one or more of the components via a shared communication link such as a vehicle communication bus (for example, a controller area network (CAN) bus) or a wireless connection.

Figure 2A:
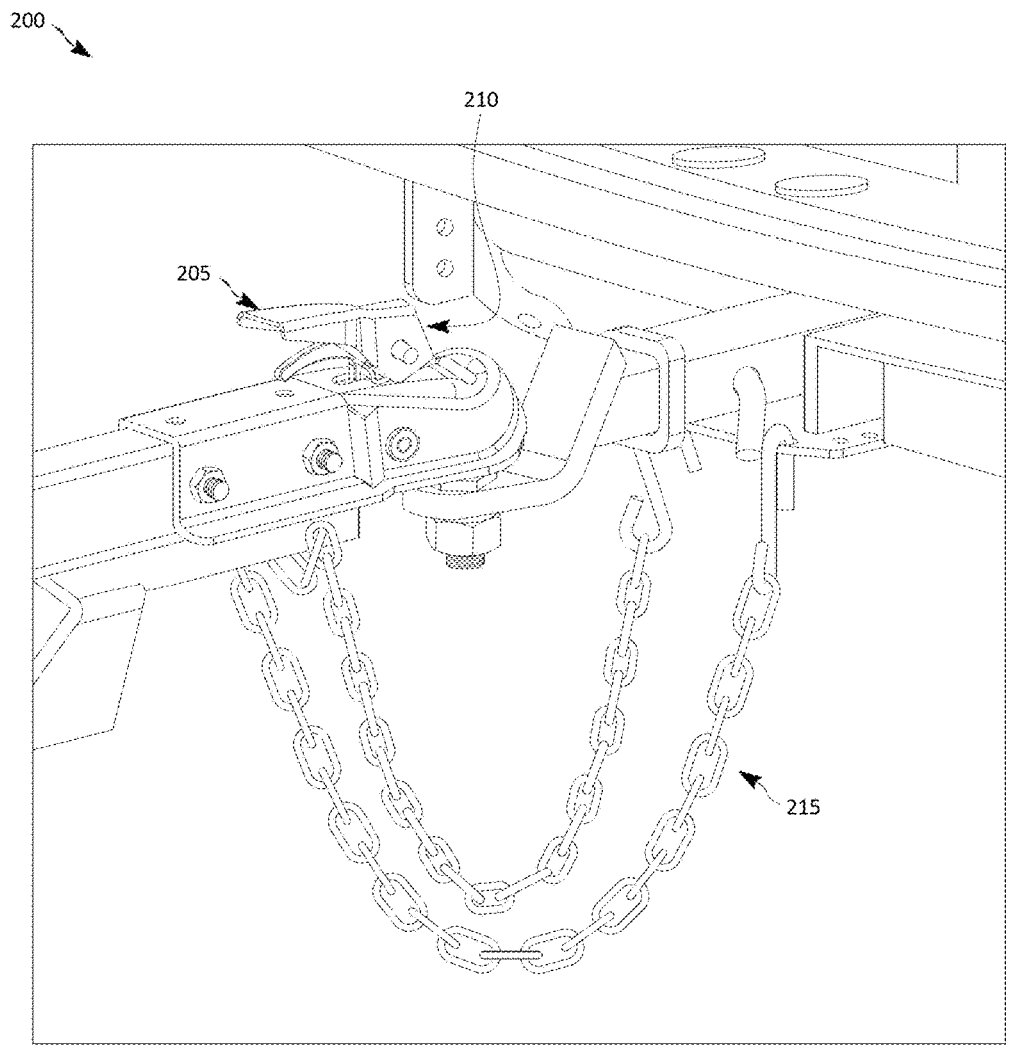
FIG. 2A is an illustration of an example hitch for connecting a trailer and a vehicle.

FIG. 2A illustrates an example hitch 200 for connecting the vehicle 100 to the trailer 105. The hitch 200 includes several hardware components including a trailer coupler 205, trailer coupler latch pin 210, and trailer chains 215. The hitch 200 for connecting the trailer 105 to the vehicle 100 is secure. The trailer coupler 205 is in the latched position. The trailer coupler latch pin 210 is in place, holding the trailer coupler 205 in the latched position. The trailer chains 215 are crossed and connect the trailer 105 to the vehicle 100. The trailer chains 215 act as a failsafe if the trailer coupler 205 becomes unlatched.

Figure 2B:
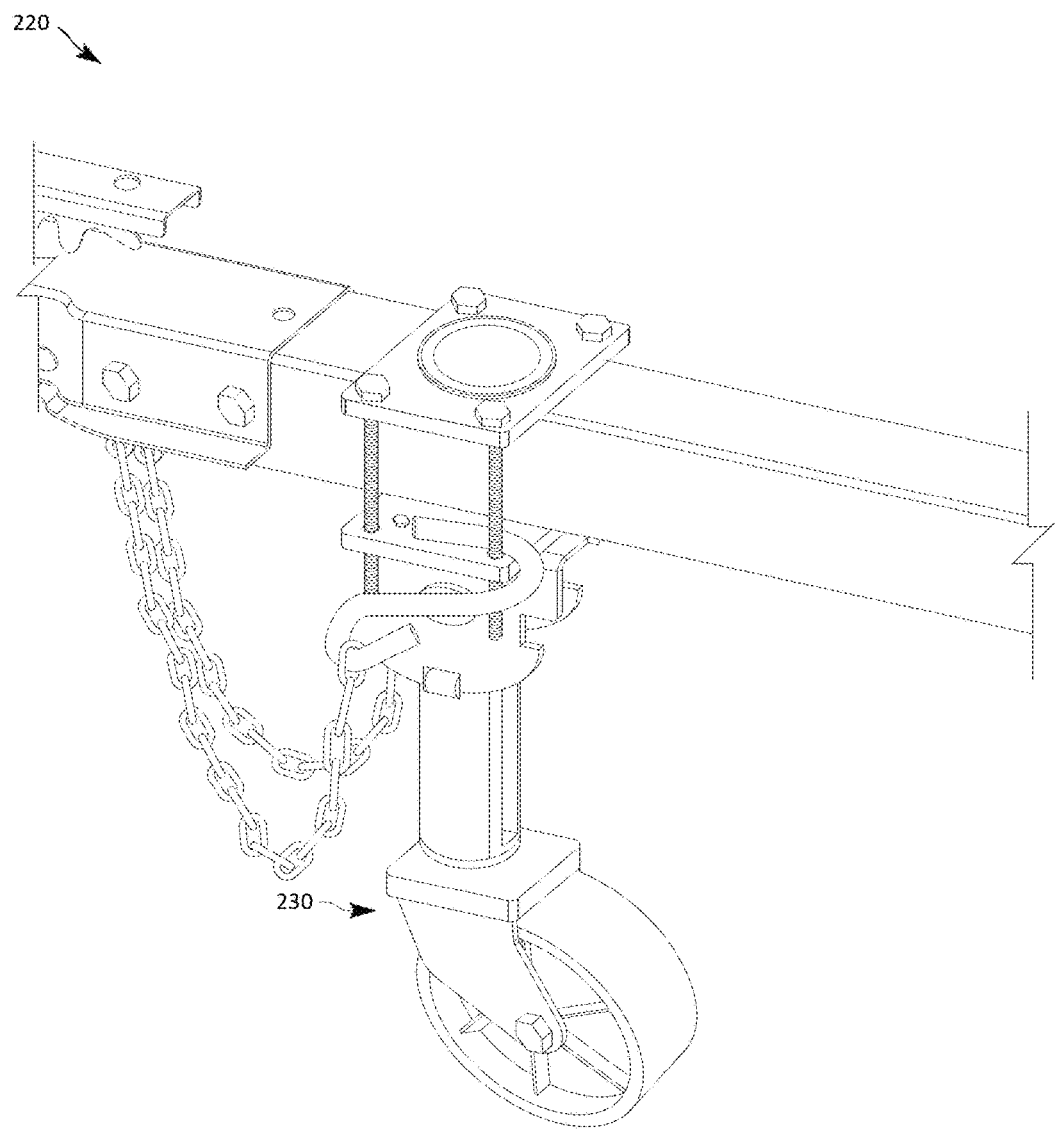
FIG. 2B is an illustration of an example hitch for connecting a trailer and a vehicle.

FIG. 2B illustrates an example hitch 220 for connecting the vehicle 100 to the trailer 105. The hitch 220 includes several hardware components including a trailer tongue wheel 230. The hitch 220 is not secure because the trailer tongue wheel 230 is not retracted.

Figure 3:
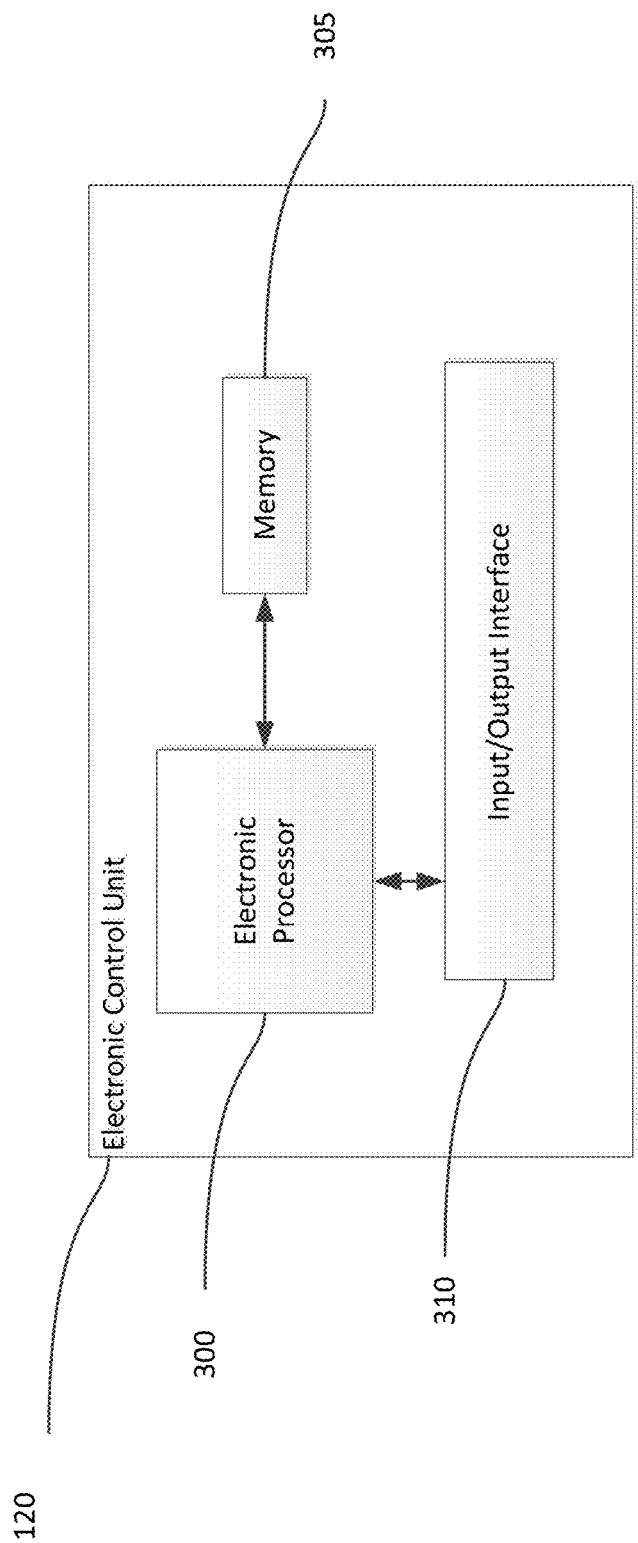
FIG. 3 is a block diagram of an electronic control unit of the system of FIG. 1.

FIG. 3 is a block diagram of the electronic control unit 120 of the system of FIG. 1. The electronic control unit 120 includes a plurality of electrical and electronic components that provide power, operation control, and protection to the components and modules within the electronic control unit 120. The electronic control unit 120 includes, among other things, an electronic processor 300 (such as a programmable electronic microprocessor, microcontroller, or similar device), a memory 305 (for example, non-transitory, machine readable memory), and an input/output interface 310. The electronic processor 300 is communicatively connected to the memory 305 and the input/output interface 310. The electronic processor 300, in coordination with the memory 305 and the input/output interface 310, is configured to implement, among other things, the methods described herein.

The electronic control unit 120 may be implemented in several independent controllers (for example, programmable electronic control units) each configured to perform specific functions or sub-functions. Additionally, the electronic control unit 120 may contain sub-modules that include additional electronic processors, memory, or application specific integrated circuits (ASICs) for handling input/output functions, processing of signals, and application of the methods listed below. In other embodiments, the electronic control unit 120 includes additional, fewer, or different components.

The electronic control unit 120 has, stored in memory 305, a neural network classifier for the trailer coupler 205, a neural network classifier for the trailer coupler latch pin 210, a neural network classifier for the trailer chains 215, and a neural network classifier for the trailer tongue wheel 230 or a trailer jack. The neural network classifiers can be used to recognize secure and unsecure conditions for different types of hitches and for different types of vehicles attached to a trailer via the hitch 110. For example, the neural network classifier for the trailer coupler 205 detects secure and unsecure conditions in the trailer coupler 205 whether the vehicle that the trailer is connected to is a truck or a motorcycle. The neural network classifiers can recognize secure and unsecure conditions given different vantage points or angles of the hitch 110. For example, the neural network classifier for the trailer chains 215 will be able to recognize if the trailer chains 215 are not crossed using the video feed from the video camera 135 whether the video camera 135 is mounted at the base of the vehicle 100 or on the roof of the vehicle 100.

Figure 4:
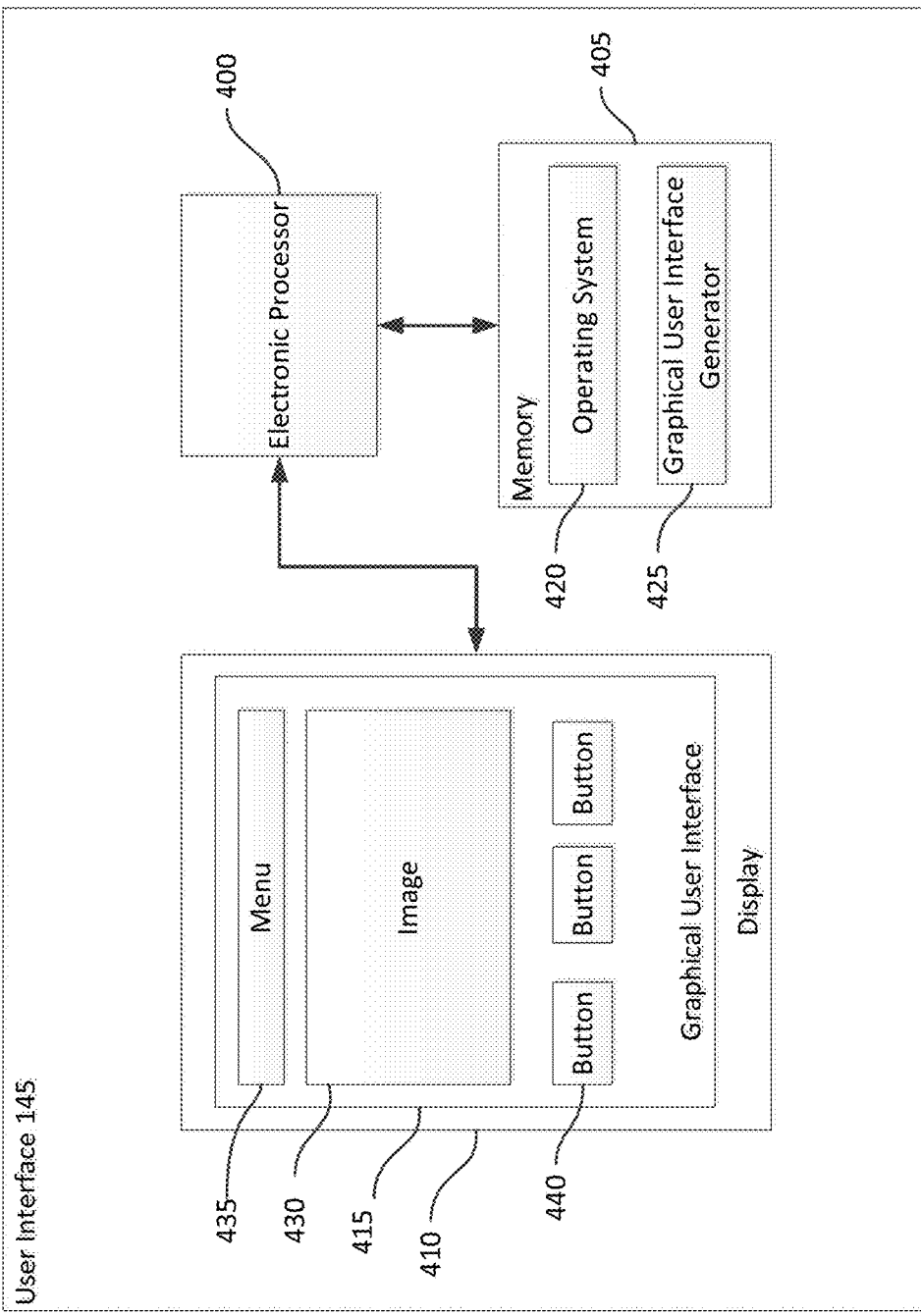
FIG. 4 is a block diagram of a user interface of the system of FIG. 1.

FIG. 4 is a block diagram of the user interface 145 of the system 115 of FIG. 1. The user interface 145 includes, among other things, an electronic processor 400 (such as a programmable electronic microprocessor, microcontroller, or similar device), a memory 405 (for example, non-transitory, machine readable memory), and a display 410. The electronic processor 400 is communicatively connected to the memory 405 and the display 410. The memory 405 has stored within it several software components for creating a graphical user interface 415 and processing user input, including an operating system 420 and a graphical user interface generator 425. The electronic processor 400, in coordination with the memory 405 and the display 410, is configured to generate the graphical user interface 415 and receive user input from the display 410. The display 410 is a touch screen displaying the graphical user interface 415. One or more images 430 captured by the video camera 135 may be displayed within the graphical user interface 415. The graphical user interface 415 may also display elements such as a menu 435 and virtual buttons 440. The user is able to input information into the display 410 in a variety of ways, such as selecting via a mouse or touching the image 430, the menu 435, or the virtual buttons 440.

In some instances, the neural network classifiers are modified (and improved) by user input, received via the user interface 145. For example, in some instances, a user informs the electronic control unit 120 when the hitch 110 is secure or not secure. For example, the user may place the trailer coupler 205 in the unlatched position. When the graphical user interface 415 displays the image 430 of the trailer coupler in the unlatched position, the user sends an indication to the electronic control unit 120 via the graphical user interface 415 that the trailer coupler 205 is unsecure.

FIG. 5 illustrates a method 500 of detecting if a hitch connecting a trailer and a vehicle is not secure using the system 115. The electronic control unit 120 receives information about the hitch 110 connecting the vehicle 100 and the trailer 105 from one or more sensors, such as the video camera 135 and the ultrasonic sensor 140. The electronic control unit 120 detects that the vehicle 100 is connected to the trailer 105 via a hitch 110 (block 505). The system 115 used to detect if a hitch connecting a trailer and a vehicle is not secure has been trained, using machine learning techniques, to recognize several conditions in the input (for example, video or video stream) from the video camera 135 and the ultrasonic sensor 140 that indicate the trailer 105 is not securely attached to the vehicle 100. If the electronic control unit 120 detects any of the conditions that indicate the trailer 105 is not securely attached to the vehicle 100 the electronic control unit 120 generates and sends a signal to the output device 125 to output a driver notification (block 530). The driver notification may be an audio or visual notification, such as a light on a heads up display or a beeping alarm. The electronic control unit 120 may also send a signal to the braking control system 130 to inhibit or control the vehicle's motion upon detecting any of the conditions that indicate the trailer 105 is not securely attached to the vehicle 100 (block 530). The conditions that indicate the trailer 105 is not securely attached to the vehicle 100 include the trailer chains 215 not being crossed and connecting the trailer 105 to the vehicle 100 (block 510), the trailer coupler 205 not being in the latched position (block 515), the trailer coupler latch pin 210 not being installed (block 520), and the trailer tongue wheel 230, or a trailer jack, not being retracted (block 525).

If the engine of vehicle 100 has just been started (block 535) the electronic control unit 120 reports the results of detecting if the hitch 110 connecting the trailer 105 and the vehicle 100 is not secure to the user via the user interface 145 (block 540). The user can provide feedback to the electronic control unit 120 to indicate whether the reported results are correct or incorrect. The feedback from the user will help to improve the neural network classifiers stored in the memory 305 of the electronic control unit 120 (block 545).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

In this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Various features, advantages, and embodiments are set forth in the following claims.

The invention claimed is:

1. A system for detecting if a hitch connecting a trailer and a vehicle is not secure, the system comprising;
   a video camera;
   an output device; and
   an electronic control unit configured to,
   receive from the video camera, video of the hitch connecting the trailer and the vehicle;
   using the video of the hitch, detect if the hitch connecting the trailer and the vehicle is not secure when a trailer coupler is not in a latched position or a trailer chains are not crossed and connected to the trailer and the vehicle;
   generate a driver notification; and
   control a motion of the vehicle upon detecting the hitch connecting the trailer and the vehicle is not secure.

2. The system according to claim 1, wherein the electronic control unit detects if the hitch connecting the trailer and the vehicle is not secure using neural network classifiers.

3. The system according to claim 2, wherein input received by the electronic control unit via a user interface is used to modify the neural network classifiers.

4. The system according to claim 1, wherein results of detecting if the hitch connecting the trailer and the vehicle is not secure are displayed via a user interface.

5. The system according to claim 1, wherein the driver notification is an audio or visual notification.

6. A method for detecting if a hitch connecting a trailer and a vehicle is not secure, the method comprising;
   receiving, from a video camera, video of the hitch connecting the trailer and the vehicle;
   detecting, with an electronic control unit using the video of the hitch, if the hitch connecting the trailer and the vehicle is not secure when a trailer coupler is not in a latched position or a trailer chains are not crossed and connected to the trailer and the vehicle;
   generating, with the electronic control unit, a driver notification;
   controlling, with the electronic control unit, a motion of the vehicle upon detecting the hitch connecting the trailer and the vehicle is not secure; and
   outputting, with an output device, the driver notification.

7. The method according to claim 6, wherein the electronic control unit detects if the hitch connecting the trailer and the vehicle is not secure using neural network classifiers.

8. The method according to claim 7, wherein input received via a user interface is used to improve the neural network classifiers.

9. The method according to claim 6, wherein results of detecting if the hitch connecting the trailer and the vehicle is not secure are displayed via a user interface.

10. The method according to claim 6, wherein the driver notification is an audio or visual notification.

* * * * *